UNITED STATES PATENT OFFICE.

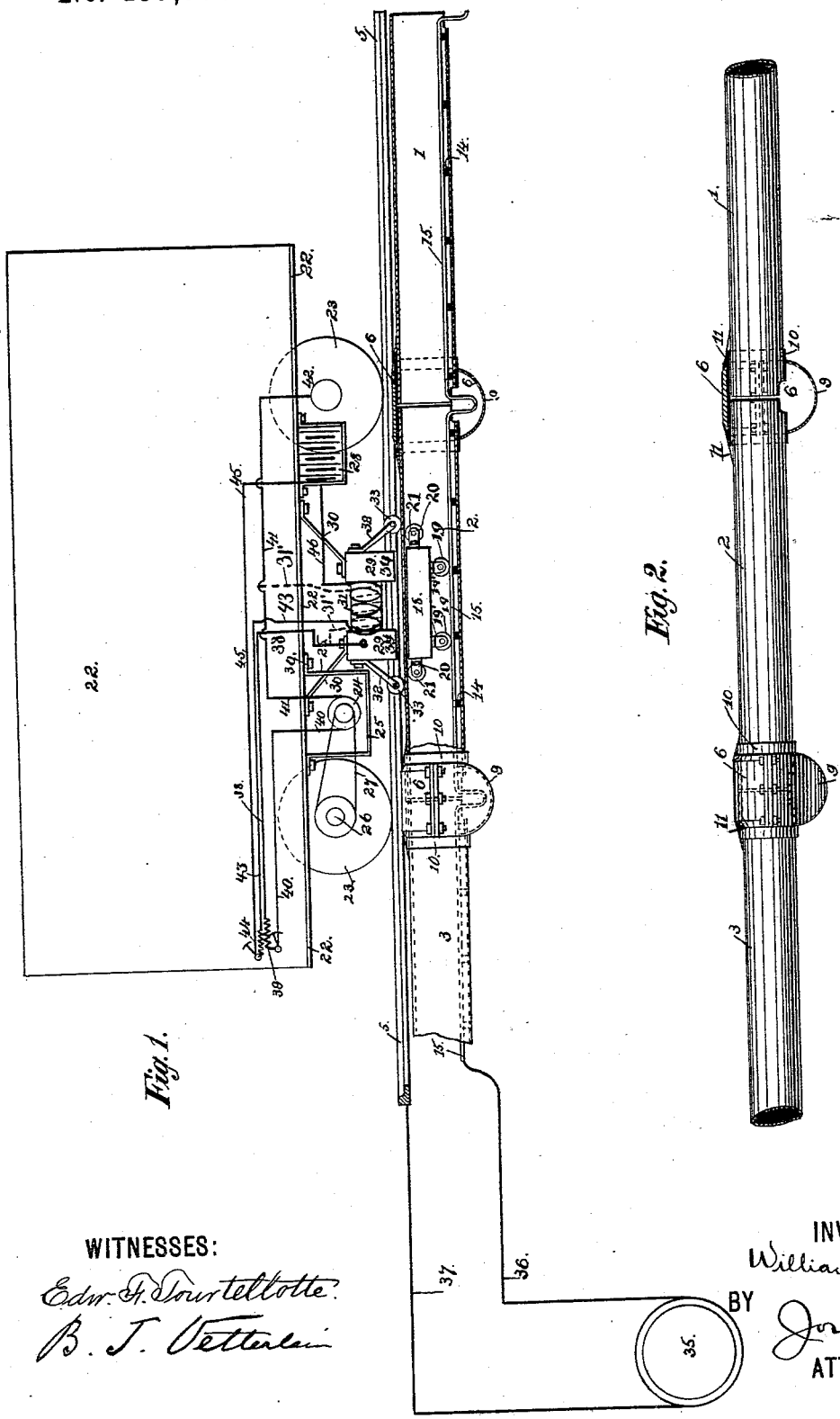

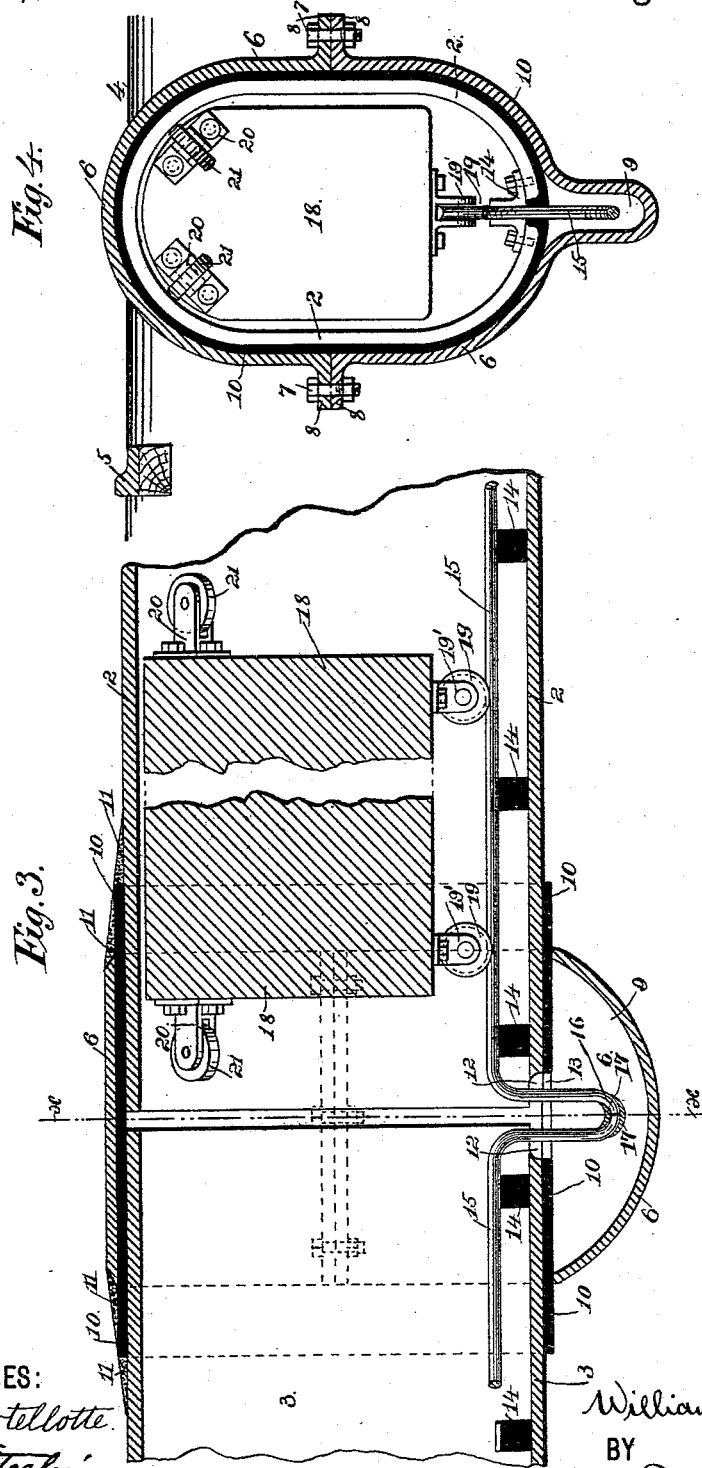

WILLIAM B. HERON, OF BROOKLYN, NEW YORK, ASSIGNOR OF ONE-HALF TO HORACE E. BUNKER, OF SAME PLACE.

CLOSED-CONDUIT SYSTEM FOR ELECTRICAL PROPULSION.

SPECIFICATION forming part of Letters Patent No. 457,778, dated August 18, 1891.

Application filed March 27, 1891. Serial No. 386,654. (No model.)

*To all whom it may concern:*

Be it known that I, WILLIAM B. HERON, a citizen of the United States, residing in Brooklyn, in the county of Kings and State of New York, have invented a new and useful Closed-Conduit System for Electrical Propulsion, of which the following is a specification.

My invention relates to those systems of electrical railway in which a closed conduit is used; and it consists of a closed conduit laid in and projecting a little above the ground, in which conduit is placed the main conductor or feeder, from which the current is passed to a motor mounted upon the car to be propelled.

My invention primarily relates to the method of taking the current from the feeder and transferring it to the car or motor mounted thereon, in which I use for this purpose what I term a "traveling contact or armature," which I cause to travel with the car and through which electrical communication is had between the motor and main feeder, and I employ for this purpose a magnet secured to and traveling with the car and located over the conduit and which when properly energized attracts and carries along with it the traveling armature, electrical connection being established between the feeder, traveling contact or armature, the magnet, and motor, as hereinafter set forth.

My invention also has special reference to the construction of the conduit and the insulation of the joints thereof.

Similar figures of reference refer to like parts throughout the several views.

In the drawings, Figure 1 is a general diagrammatic view of the car and conduit, the latter being shown partly in cross-section, the former being purely diagrammatic; Fig. 2, a side elevation of the conduit-sections, one of the unions being shown in cross-section; Fig. 3, a longitudinal cross-section, enlarged, of the conduit and traveling contact or armature, showing the method of constructing or uniting the ends of the conduit and the insulation of one section from the other, the traveling armature being shortened for the purpose of saving space; Fig. 4, a transverse section of the same on the line *x x*, Fig. 3.

I shall first describe the conduit, its method of construction, and the insulation of the sections thereof from each other.

1 2 3 are respectively the conduit-sections, made of iron or any suitable conducting material, and are laid in the ground approximately as illustrated in Fig. 4, ground there being shown at 4, with the track rail or rails 5 located on both sides of the conduit. The top of the conduit-sections should be preferably open above the ground—that is, they should extend above it for a short distance. The conduit-sections are made preferably shorter between their insulated unions than the wheel-base of the car to be propelled.

At 6 are the couplings for the conduit-sections, said couplings being made each in two parts, both of which conform to the shape of the conduit-sections and which are united together by bolts 7, passing through flanges 8, extending from the upper and lower halves of the coupling. The lower half of the coupling is provided with a downwardly-extending enlargement or pocket 9.

In laying the conduit the ends of the conduit-sections are not brought completely together, but are placed a short distance from each other. Around these ends are placed sleeves 10, of insulating material, these sleeves and the disposition of the conduit-sections insulating them from each other, and they remain so insulated, except when the traveling contact or armature is in contact with the ends of two adjacent conduit-sections. When these insulating-sleeves have been placed properly in position around the ends of the conduit-sections, the coupling-sections are placed around the insulating-sleeves and properly brought together by means of the bolts 7, whereby the conduit-sections are united into a continuous line; but at the same time the devices for uniting them are insulated from said conduit.

As shown in the drawings, and at Fig. 3 especially, the upper portions of the insulating-sleeves 10 and the couplings 6 extend up above the conduit-sections and leave an obstruction. For the purpose of leveling off this obstruction I lay asphalt or other suitable material 11, by which a gradually-inclined plane is produced, the purpose of which will be hereinafter set forth.

The lower portions of the conduit-sections immediately at their point of union with their opposing sections are slotted, as shown at 12, Fig. 3, said slot being located over the pocket 9 of the coupling. The insulated sleeves 10 are likewise provided with a slot 13 at the same place.

Within the conduit-sections are placed and secured in any suitable manner insulated blocks or rests 14, upon which the main feeder or conductor 15 rests and by which it is insulated from the conduit-sections. The feeder is laid along on these rests, and is looped, as at 16, for the purpose of giving it slack to enable a movement to take place in the whole line, which may be caused by depression or contraction or expansion, and also for the purpose of facilitating the union of the ends of the feeder-sections. This union is preferably made as shown in Fig. 3, where the ends of the feeder are cut away or narrowed and are soldered together, as shown at 17.

Within the conduit-sections is the traveling contact or armature 18. This may be of any conductive and magnetizable material, preferably of soft iron, and may be of any suitable shape. The armature is held in a steady position within the conduit-sections and is provided below with wheels 19, suitably supported in brackets 19', which wheels should be preferably of the same material as the armature. They are adapted for riding on the main feeder 15. At the top of the armature and on each end thereof I project brackets 20, carrying contact-wheels 21. These brackets and wheels should be so adapted and arranged that they will bind or press against the conduit-section, so as to provide electrical communication between the armature and the conduit-section. If desired, these wheels could be pressed or held against the conduit-section by means of springs.

I will now describe the car, its electrical operating devices, and the circuits for the same.

At 22 is a car of any suitable construction, provided with wheels 23, adapted to ride on the rails 5. A motor 24, of any suitable construction, is secured to the car within the box 25, and is connected with the axle 26 of one of the wheels by a belt 27. Of course any style or construction of motor can be used which will be found to be operative for the purpose of this invention, and the mounting or carrying of the same upon the car and connection with the wheels thereof left to the constructor's pleasure.

At 28 is shown what I term an "auxiliary generator," which may be either a primary or secondary battery or any other suitable electro-generating device.

29 is an electro-magnet firmly secured to the car by means of the braces 30 or in any other desirable way. The magnet 29 has extending from it brackets 32, having contact-wheels 33, which wheels impinge and rest upon the top of the conduit and should be adapted to be kept in electrical communication with the surface of the same. The brackets 32 should preferably be flexible to provide for a constant pressure of the contact-wheels on the conduit, and also to enable the wheels to mount and ride the inclined surface 11 at the conduit-unions, the ends of said brackets being preferably connected to the core of the magnet 29. The pole-pieces 34 of the magnet extend down to near the top of the conduit, but should be high enough above them to clear the top of the coupling 6. The magnet, when energized, attracts and draws along with it the armature 18, and through it and the magnet electrical connection is established with the motor.

At 35 is a generator of electricity of any suitable construction, and from this is led a line-wire 36, which connects with the main feeder 15. The wire 36 and feeder 15 form one side of the circuit and the rail 5 the other, the rail and generator being connected by the wire 37. From the magnet 29 extends a wire 38, having a switch 39. From the switch 39 the line-wire 40 is led, which is connected with one of the commutator-brushes of the motor 24. From the other commutator-brush leads a line-wire 41, which extends to the wheel, as at 42, thereby establishing electrical connection between the rail and motor.

At all times when the motor 24 is being operated—that is, when the main circuit is closed—it is necessary that the magnet be energized to propel the armature, and I preferably accomplish this by shunting a part of the main circuit through the magnet. One way of doing this is as illustrated in Fig. 1, in which it will be seen that a wire 31' (shown in dotted lines) is led from the line-wire 41 of the main circuit to and around the magnet 29 and from there to line-wire 38 of the main circuit. This shunt should be made of as fine a wire as can be practically used, in order to get suitable resistance in the shunt-circuit, but should be of sufficient size to energize the magnet. From the auxiliary generator 28 is led a wire 45, extending to a switch 44, and from there back to the magnet by a wire 43 through the magnet-coil 31, (in heavy lines,) the magnet-coil 31 and auxiliary generator 28 being connected by the wire 46.

From the foregoing it will be seen that I have devised a circuit for the operation of the motor on the car and the energization of the magnet to complete (by attracting the armature) the main circuit and another for running the auxiliary current for the magnet by which it can be independently energized to pick up the armature when necessary.

The circuit for running the motor 24 extends as follows: The main circuit being closed by the switch 39, the circuit will extend from the generator 35 through the line-wire 36 to the feeder 15, from thence to the traveling armature 18, through it to the conduit-section in which the armature may be located, through the contact-wheels 33 to the pole-pieces 34 of the magnet, from the magnet pole-pieces by way of the wire 38 to and through the switch 39, and by way of the line-wire 40 to the motor, from there by means of the line-wire 41 to the car-wheel 23, from thence to the rail 5, and from the rail by way of the line-wire 37 to the generator, the shunt-circuit being led as before set forth. The auxiliary circuit is operated by closing the switch 44, by means of which the current will extend from the auxiliary generator 28 through the line-wire 45 to and through the switch 44 and by means of the line-wire 43 to the magnet through the magnet-coil 31, returning by the wire 46.

The conduit-sections and the rail should be properly insulated from each other.

In the practical operation of my device the electro-magnet 29 is primarily energized by shunting through it a portion of the current from the main circuit, as before set forth; but in the case of emergency and to assist in starting the car at the beginning of the trip this would be done by means of the auxiliary circuit. When the energized electro-magnet has been brought in position over the armature, as shown in Fig. 1, the current from the generator will pass from the feeder 15 in the manner hereinbefore described. By the insulation of the ends of the conduit-sections, as before described, the current will be prevented from passing through any section of the conduit except the one which is immediately under the magnet, thereby obviating the danger of a circuit being made through any other part of the system.

When the traveling armature 18 extends between the ends of any two of the sections, both of the sections upon which the contact-wheels 21 press will be in circuit; but a circuit will not be made from one section to the other by reason of the insulation. Thus when the car is in progress, with the electro-magnet drawing the traveling armature along with it, the current will pass into and through each conduit-section in succession, leaving the other sections free from any circuit-making capacity.

Having described my invention, what I claim as new, and desire to secure by Letters Patent, is—

1. In a closed-conduit system, the combination of a conduit, a traveling armature in said conduit, a wheeled vehicle, a motor and a magnet on said vehicle, a source of electrical energy leading to the motor to operate it, and an auxiliary source of electrical energy leading to the magnet to energize it to attract the armature, substantially as described.

2. In a closed-conduit system, the combination of a conduit, a traveling armature in said conduit, a wheeled vehicle, a motor and a magnet on said vehicle, a source of electrical energy leading to the motor to operate it, a shunted circuit leading from the source of supply to and about said magnet to energize it to attract and propel the armature, and an auxiliary source of electrical energy leading to and about the said magnet and adapted to energize it, substantially as described.

3. In a closed-conduit system, the combination of a conduit, the traveling armature within the conduit, a wheeled vehicle adapted to travel over said conduit, an electro-magnet carried by the car and adapted to be energized to attract and propel the traveling armature, a motor on the car, a suitable source of electrical energy in electrical connection with the said motor, and an auxiliary generator and circuit carried by the car and adapted to independently energize the said electro-magnet, substantially as described.

4. In a closed conduit, means for insulating the conduit-sections, consisting of spaced sections and insulating-sleeves 10, passing around the ends of the abutting sections, substantially as described.

5. In a closed conduit, the conduit-sections removed a short distance from each other, insulating-sleeves surrounding the ends of the sections, and detachable couplings around the said sleeves, substantially as described.

6. In a closed-conduit system, the conduit-sections removed a short distance from each other, a main conductor or feeder within said conduit, insulating-blocks between the conductor and conduit, an insulating-sleeve around the ends of the abutting conduit-sections, and detachable couplings around said sleeve, substantially as described.

7. A closed conduit comprising the conduit-sections 2 and 3, insulating-blocks 14 for supporting a conductor within the conduit, a slot 12 in the ends of the conduit-sections, a slot 13 in the insulating-sleeves, a detachable coupling 6 around the insulating-sleeves, the lower part of said coupling being provided with a pocket 9, substantially as described.

8. The conductor 15, having at its ends the cut-away portions 17, united by solder or the like, substantially as described.

Signed at the city of New York, county of New York, and State of New York, this 25th day of March, 1891.

WILLIAM B. HERON.

Witnesses:
JOSEPH L. LEVY,
HERBERT DURBUR.